Nov. 6, 1923.

F. STEIGMEYER 1,473,165

SEED CONDITIONING APPARATUS

Filed Dec. 4, 1922 2 Sheets-Sheet 1

Inventor
Frederick Steigmeyer
By Watson E. Coleman
Attorney

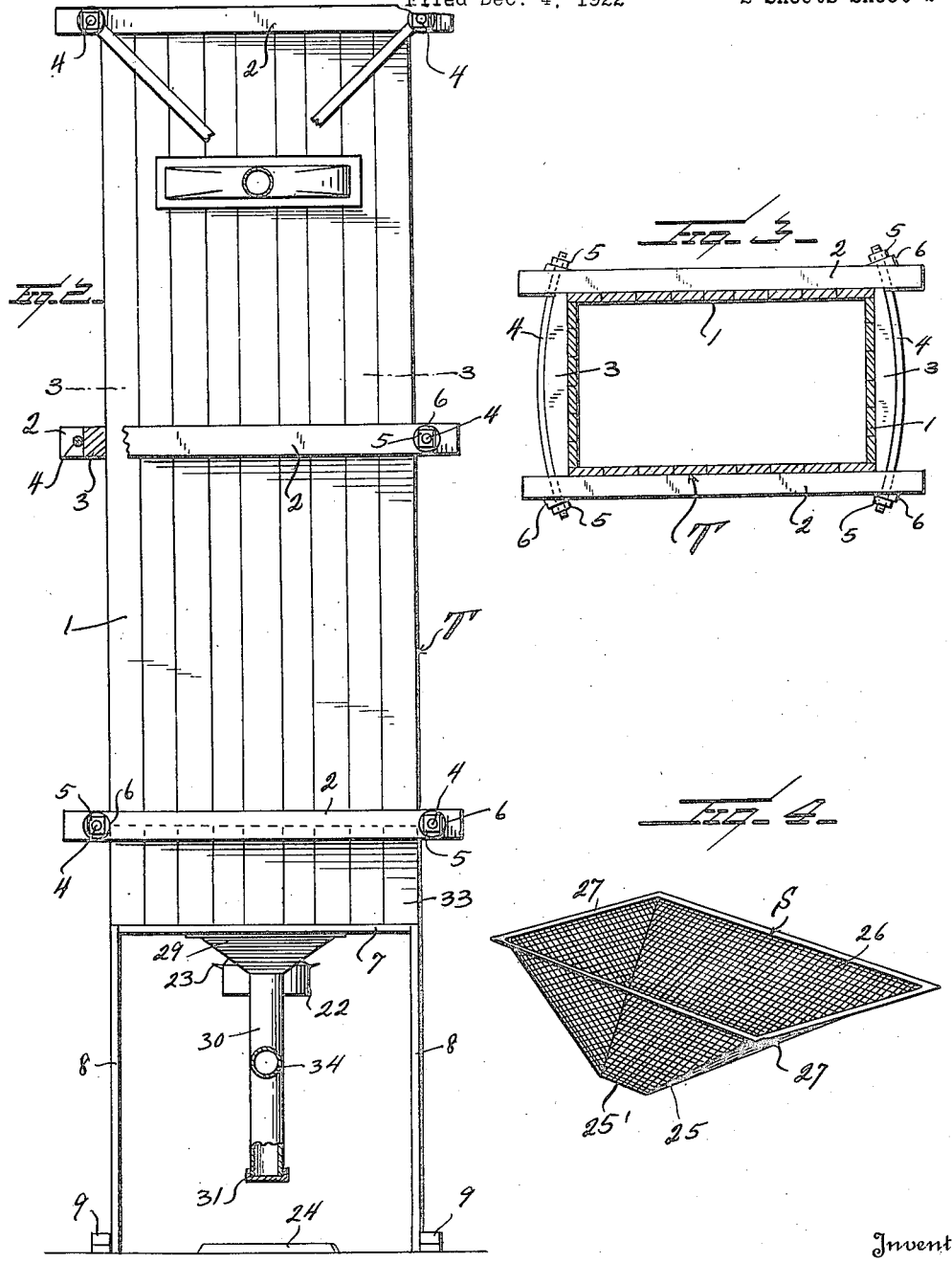

Patented Nov. 6, 1923.

1,473,165

UNITED STATES PATENT OFFICE.

FREDERICK STEIGMEYER, OF WESTHAVEN, CALIFORNIA.

SEED-CONDITIONING APPARATUS.

Application filed December 4, 1922. Serial No. 604,816.

*To all whom it may concern:*

Be it known that I, FREDERICK STEIGMEYER, a citizen of the United States, residing at Westhaven, in the county of Fresno and State of California, have invented certain new and useful Improvements in Seed-Conditioning Apparatus, of which the following is a specification, reference being had to the accompanying drawings.

This invention relates to a seed conditioning apparatus and has relation more particularly to a machine of this general character especially designed and adapted for use in connection with wheat and other grain and it is an object of the invention to provide a machine of this general character embodying novel and improved means whereby seeds, before being planted, may be treated in a manner to prevent parasitic diseases, bacteria, fungus or otherwise.

It is also an object of the invention to provide a novel and improved apparatus of this general character which can be employed to advantage to improve condition and appearance of seeds by thoroughly aerating the same.

An additional object of the invention is to provide a machine of this general character with novel and improved means whereby the seeds may be dusted or have deposited thereon a material destructive to parasites together with the eggs and larvæ which may be on the seeds and in the immediate vicinity thereon or later appear thereof.

Furthermore it is an object of the invention to provide a machine of this general character which operates to deposit a suitable material on the seeds whereby to introduce into the soil and in the immediate vicinity or place where such seeds are planted such material as will destroy or render harmless to seed germination or plant life parasites, bacteria, fungus or of all other kind and description.

The invention also has for an object to provide a novel and improved machine of this general character which operates to deposit chemicals, dry chemical dust, or fine dry comminuted material on the seeds to stimulate germination and to invigorate root and plant life.

The invention consists in the details of construction and in the combination and arrangement of the several parts of my improved seed conditioning apparatus whereby certain important advantages are attained and the device rendered simpler, less expensive and otherwise more convenient and advantageous for use, as will be hereinafter more fully set forth.

The novel features of my invention will hereinafter be definitely claimed.

In order that my invention may be the better understood, I will now proceed to describe the same with reference to the accompanying drawings, wherein:

Figure 2 is a view in rear elevation with portions broken away of the machine as herein disclosed;

Figure 3 is a sectional view taken substantially on the line 3—3 of Figure 2 with certain of the parts omitted;

Figure 4 is a view in perspective of the screen element herein comprised.

Figure 1:
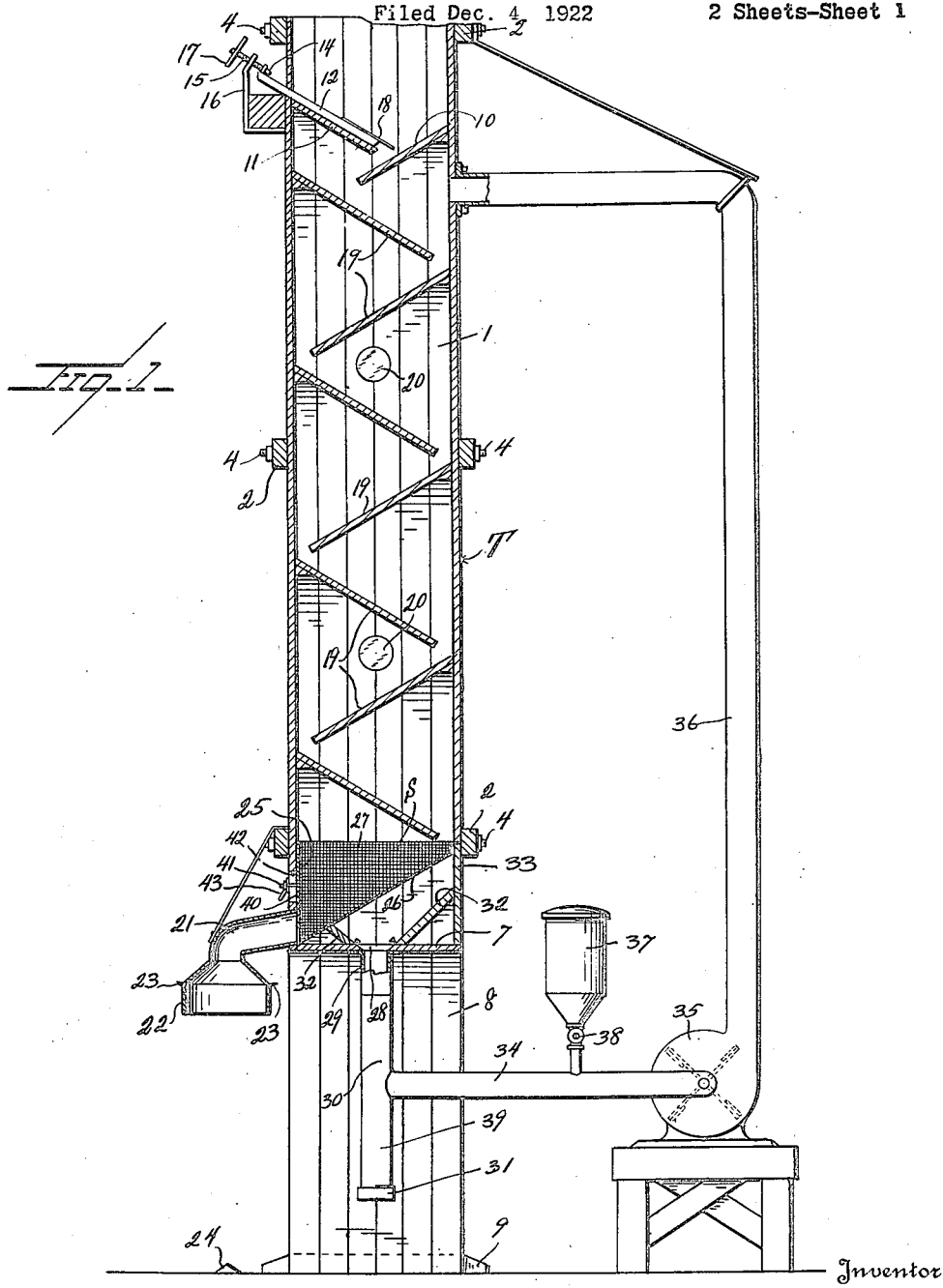
Figure 1 is a view, partly in elevation and partly in section and somewhat of a diagrammatic character illustrating a seed dusting machine constructed in accordance with an embodiment of my invention.

As disclosed in the accompanying drawings, T denotes a tower of desired dimensions and preferably ten and one-half feet in height. The tower as herein disclosed has its side walls comprising the flat strips or planks 1 and which are maintained in assembled relation by a plurality of vertically spaced bracing means. As herein disclosed each of said bracing means comprises beams 2 extending across opposed sides of the tower T and projecting beyond the sides thereof. Overlying the remaining or end walls of the tower T and substantially coplaner with the beams 2 are the brace blocks 3, each of said blocks snugly fitting between the beams 2. The outer faces of the blocks 3 are arranged on out-bows and in close contact therewith are the rods 4, the opposite extremities of which being directed through the adjacent extended end portions of the beams 2. Operatively engaged with the extremities of the rods 4 are the clamping nuts 5 and washers 6 coacting with the outer faces of the beams 2 so that upon requisite rotation of the nuts 5 the rods 4 will be drawn taut over the blocks 3 resulting in the desired maintenance of the strips or planks 1 of the tower T in assembled relation.

In the present embodiment of my invention a bracing means is positioned immediately at the top of the tower with a second means positioned adjacent to but above the bottom of the tower with the third means arranged substantially midway of the first two means.

The top of the tower is open while the bottom thereof is closed by the flooring 7. The opposite sides or walls of the tower T and preferably those walls with which are associated the blocks 3 are continued below the flooring 7 for a desired distance to provide the supporting members or legs 8 said legs being maintained in desired position at the ground level by the blocks 9.

The upper portion of the tower T at a desired distance below its top is provided with a baffle plate 10 extending inwardly and downwardly from a side wall of the tower on an angle of approximately 60°, the board extending entirely across said wall or side and is adapted to extend beyond the center between said side or wall and the one opposed thereto. Extending inwardly and downwardly from the opposed wall or side of the tower is a second baffle 11, said baffle 11 being positioned above the baffle 10 and having its lower end spaced therefrom at a point inwardly of the lower end of the baffle 10. Slidably mounted and resting upon the baffle 11 is a super or sliding baffle 12 which provides a regulating board or slide. The super or sliding baffle 12 extends exteriorly of the tower T through a suitable opening in the adjacent side or wall thereof and the outer margin of the board 12 has swivelled thereto as at 14 a shank 15 threaded through a bracket 16 carried by the tower T. The outer end of the shank 15 is provided with a cross head 17 to provide means to facilitate the rotation of the shank 15 in order to move the slide or board 12 toward or from the baffle 10 as the requirements of practice may prefer.

Resting upon and secured to the lower portion of the slide or board 12 is a plate 18 preferably of sheet metal. This plate extends outwardly beyond the lower end of the slide or board 12 and serves to provide means to make more easy the closing of the portion of the tower T above the baffle 10.

The portion of the tower T above the baffle 10 constitutes a hopper and preferably of a capacity to accommodate approximately five bushels of seed.

Arranged within the tower T below the baffle 10 and outwardly extending from opposed sides or walls of the tower T are the baffles 19 disposed on downward inclines, each of said baffles having its lower end terminating at a point approximately two inches on the horizontal from the adjacent wall or side of the tower T and two inches vertically from the nearest point on the baffle 19 immediately therebelow. The baffles 19 are also disposed substantially on an angle of 60° with respect to the side or wall of the tower to which it is attached.

The wall of the tower T at predetermined points spaced vertically thereof is provided with the windows 20 to permit visual access within the tower to determine if the seed is having requisite flow through the tower from above.

In communication with the interior of the tower through a side or wall thereof immediately adjacent the flooring 7 is a discharge spout 21 terminating in the nozzle or sacking circle 22 and which is adapted to be received within the mouth of a sack, said sack being held in the nozzle or sacking circle 22 by engagement with the outstanding hooks 23. Positioned immediately below the nozzle or sacking circle 22 is a tapered block 24 upon which a sack to be filled is rested and which serves to force the bottom of the sack inwardly to assure the seed delivered into the sack to be forced outwardly to the corners thereof.

Snugly arranged within the tower T below the lowermost baffle 19 is a screening element S, the walls of which are herein disclosed as comprising reticulated fabric of desired mesh. A wall 25 of the element S is open and is arranged immediately adjacent to the tower T with which is associated the spout 21. The opposed wall 26 is inclined downwardly to the bottom of the wall 25 while the side walls 27 are arranged on inward inclines and to such an extent that the lower central portion 25' of the wall 25 of the element S is of a width substantially equal to the width of the receiving end of the nozzle 21.

The central portion of the flooring 7 is provided with an opening 28 and which discharges within a hopper 28 having its bottom wall downwardly converging toward the center and in communication with said central portion of the hopper 28 is a depending tubular member or pipe 30 having its lower end closed by a removable cap 31. Arranged within the tower T below the screening element S are the removable panels 32 inwardly and downwardly inclined toward the opening 28. The application or removal of the panels 32 is facilitated by having the lower portions 33 of the members or boards 1 in one of the sides or walls of the tower T removable.

In communication with the tubular member or pipe 30 at a predetermined point above its lower end is a pipe 34 leading to a suction fan 35. This fan 35 may be of any preferred construction and operated in any manner as may be desired. The casing of the fan 35 has leading therefrom the blast pipe 36 which discharges within the upper portion of the tower T at a point below the baffle 10 and above the uppermost baffle 19 as is clearly illustrated in Figure 1 of the accompanying drawings.

37 denotes a receptacle positioned above the pipe 34 and in communication therewith, such communication being under control by a valve 38. The portion of the member or pipe 30 below the pipe 34 provides a trap 39.

For controlling the discharge through the spout 21 I provide a slide plate or valve 40 provided with an outstanding shank 41 disposed through a slot 42 provided in the adjacent side or wall of the tower T. Coacting with the shank 41 and said wall or side of the tower T is a clamping member 43 whereby the plate or valve 40 may be held in its desired adjustment.

It is the purpose of the present invention to aerate grain or other seed before planting or to dust the same with a suitable material, such as copper carbonate, to prevent parasitic diseases, bacteria, fungus or the like; to serve as a repellent to insects or other pests; to destroy eggs and larvæ of parasites which may be or later appear on the seeds or in the immediate vicinity thereof; to introduce into the soil in the immediate vicinity of the places where such treated seeds are planted such material as will destroy or render harmless to seed germination and plant life parasites and the like; and to deposit material on seeds to stimulate germination and invigorate root and plant life. In practice the slide or board 12 is adjusted to regulate the flow from the upper portion or hopper of the tower T, and the flow through the nozzle 21 is closed by proper adjustment of the valve or plate 40. The receptacle 37 is filled with a suitable supply of dust such as copper carbonate. Before the seed is permitted to flow downwardly through the tower, the valve 35 is operated to effect a flow of air and dust downwardly through the tower T and the density of the dust in the air within the tower T can be observed through either one of the windows 20.

When apparently the required density of dust is obtained a small quantity of seed is permitted to discharge from the hopper or upper portion of the tower T and the plate or valve 40 opens sufficiently to permit said seed to pass into an applied sack. The seed is then inspected, preferably with the use of a magnifying hand glass, to observe whether or not the seed is uniformly covered with dust, or if other effective treatment desired, such as brightening and conditioning only, has been accomplished. If the dust coating is too thin or insufficient the feeding flow of dust is increased and vice versa. When the test shows the treatment of the seed to be correct, the grain is then permitted to flow in a stream downwardly through the hopper although it is to be understood that at predetermined intervals it is of advantage to give further inspection. The screening element S collects the seed as it passes downwardly through the tower and directs the same to the discharge nozzle 21 while the surplus dust will pass through the screen and be drawn through the member or pipe 29 and the pipe 34 and thus be returned to the upper portion of the tower T for further use.

If any foreign substance, heavier than the suspended dust finds its way through the tower T and is small enough to pass through the screening element S, such substance will find lodgment in the trap 39 and which trap can be readily emptied from time to time by the removal of the cap 31.

The blast entering the tower is directed against the lower portion of the baffle 10 and the downward air current set in motion by the seed falling over the baffles 19 together with a downward suction blast created within the tower by the fan 35, will carry the suspended powder to and through the screening element and into the suction pipe 34 and then all the dust blown into the tower at the top thereof except that which is deposited on the seed being treated is returned to the fan and back into the blast and tower.

If my apparatus is used in conjunction with an elevator the feed to the hopper may be by gravity direct from the screens of the cleaners, although the manner of depositing the seed to be treated within the upper portion of the tower T forms no part of my present invention.

While I have particularly referred to the seed as being treated with a suitable dust, it is to be understood that the valve 38 controlling the communication between the receptacle 37 and the pipe 34 may be closed and the seed treated only in a manner to be aerated.

From the foregoing description it is thought to be obvious that a conditioning apparatus constructed in accordance with my invention is particularly well adapted for use by reason of the convenience and facility with which it may be assembled and operated, and it will also be obvious that my invention is susceptible of some change and modification without departing from the principles and spirit thereof and for this reason I do not wish to be understood as limiting myself to the precise arrangement and formation of the several parts herein shown in carrying out my invention in practice except as hereinafter claimed.

I claim:—

1. A seed conditioning apparatus comprising a tower through which seed is adapted to travel by gravity, the lower portion of the tower being provided with a discharge, means for creating a down draft of air through the tower, and means for mixing a seed treating material with the air before the air enters the tower.

2. A seed conditioning apparatus comprising a tower through which seed is adapted to travel by gravity, the lower portion of the tower being provided with a discharge, means for creating a down draft of air through the tower, and means for mixing a dust with the air before the air enters the tower.

3. A seed conditioning apparatus comprising a tower through which seed is adapted to travel by gravity, the lower portion of the tower being provided with a discharge, means for creating a down draft of air through the tower, means for regulating the flow of the seed, and a separating element within the tower serving as a guide to direct the seed toward the discharge.

4. A seed conditioning apparatus comprising a tower provided with a discharge, a fan, a suction pipe coacting with said fan and leading from the lower portion of the tower, a blast pipe associated with the fan and leading to the upper portion of the tower, and means for admitting a seed treating material within the blast pipe.

5. A seed conditioning apparatus comprising a tower provided with a discharge, a fan, a suction pipe coacting with said fan and leading from the lower portion of the tower, a blast pipe associated with the fan and leading to the upper portion of the tower, and means for admitting a seed treating material within the blast pipe, and a separating element within the tower adjacent to the discharge opening.

6. A seed conditioning apparatus comprising a tower provided with a discharge, a fan, a suction pipe coacting with said fan and leading from the lower portion of the tower, a blast pipe associated with the fan and leading to the upper portion of the tower, means for admitting a seed treating material within the blast pipe, a separating element within the tower adjacent to the discharge opening, and a collecting trap in communication with the suction pipe.

7. A seed conditioning apparatus comprising a tower through which seed is adapted to travel by gravity, the lower portion of the tower being provided with a discharge, means coacting with the lower portion of the tower for creating a down draft of air through the tower, and a separating element within the tower serving as a guide to direct the seed toward the discharge.

8. A seed conditioning apparatus comprising a tower through which seed is adapted to travel by gravity, the lower portion of the tower being provided with a discharge, means for creating a down draft of air through the tower, a separating element within the tower serving as a guide to direct the seed toward the discharge, and a collecting trap in communication with the tower below the separating element.

9. A seed conditioning apparatus comprising a tower through which seed is adapted to travel by gravity, the lower portion of the tower being provided with a discharge, means coacting with the lower portion of the tower for creating a down draft of air through the tower, and means for regulating the flow of the seed.

In testimony whereof I hereunto affix my signature.

FREDERICK STEIGMEYER.